United States Patent [19]

Galkowski

[11] Patent Number: 4,697,270

[45] Date of Patent: Sep. 29, 1987

[54] COPPER VAPOR LASER ACOUSTIC THERMOMETRY SYSTEM

[75] Inventor: Joseph J. Galkowski, Livermore, Calif.

[73] Assignee: The United States of America as represented by the United States Department of Energy, Washington, D.C.

[21] Appl. No.: 900,860

[22] Filed: Aug. 27, 1986

[51] Int. Cl.⁴ .............................................. H01S 3/04
[52] U.S. Cl. ...................................... 372/34; 372/25; 372/56; 372/21; 372/38
[58] Field of Search ....................... 372/25, 34, 56, 21, 372/29, 26, 38, 21

[56] References Cited

PUBLICATIONS

Culick et al., "Acoustic Waves and Heating Due to Molecular Energy Transfer in an Electric Discharge CO Laser"; *IEEE Jour. Quant. Electron*, vol. QE-12, No. 10, Oct. 1976, p. 566.

*Primary Examiner*—Leon Scott, Jr.
*Attorney, Agent, or Firm*—P. Martin Simpson, Jr.; L. E. Carnahan; Judson R. Hightower

[57] ABSTRACT

A copper vapor laser (CVL) acoustic thermometry system is disclosed. The invention couples an acoustic pulse a predetermined distance into a laser tube by means of a transducer and an alumina rod such that an echo pulse is returned along the alumina rod to the point of entry. The time differential between the point of entry of the acoustic pulse into the laser tube and the exit of the echo pulse is related to the temperature at the predetermined distance within the laser tube. This information is processed and can provide an accurate indication of the average temperature within the laser tube.

12 Claims, 8 Drawing Figures

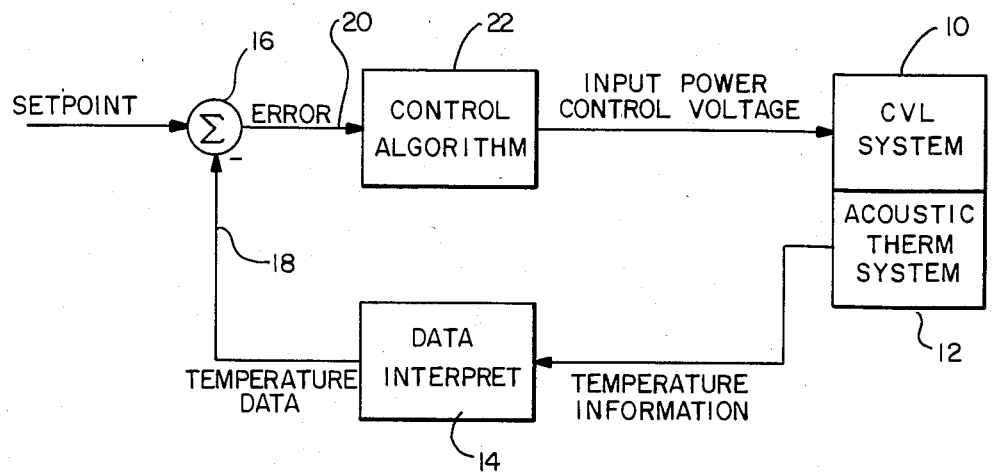
FIG.—1
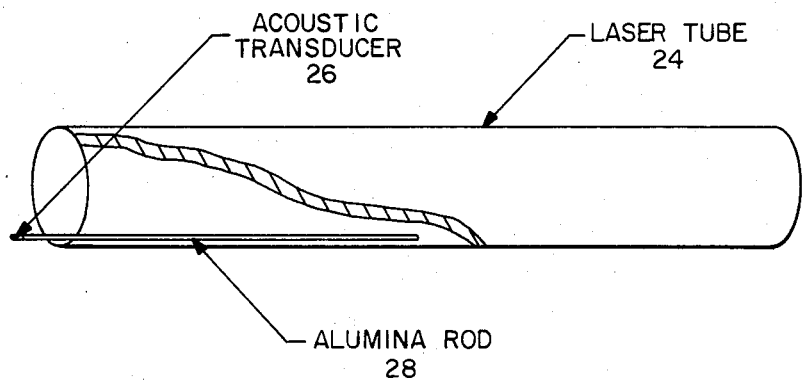
FIG.—2

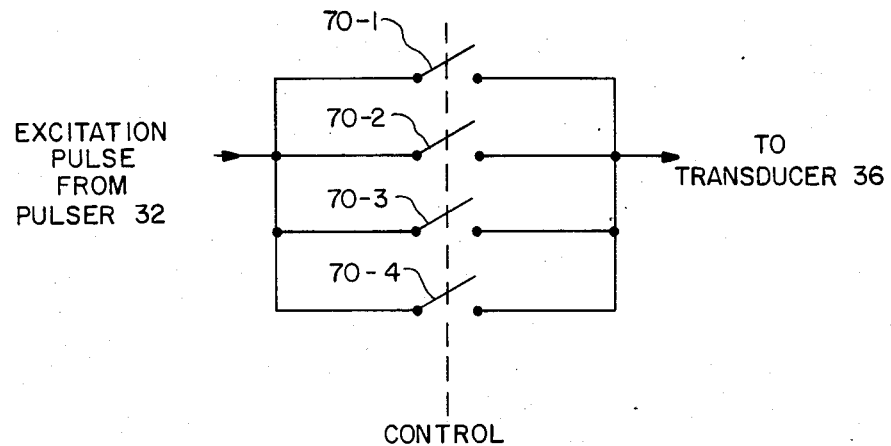
FIG. —5A
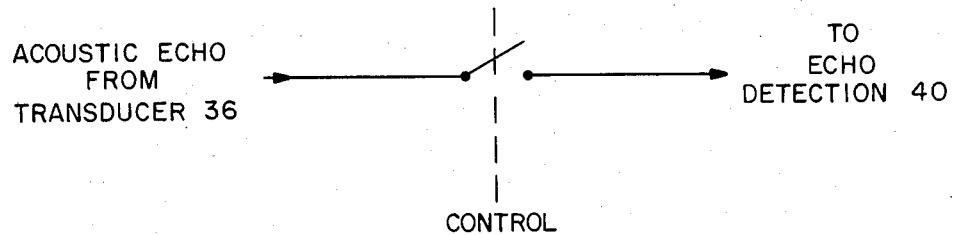
FIG. —5B

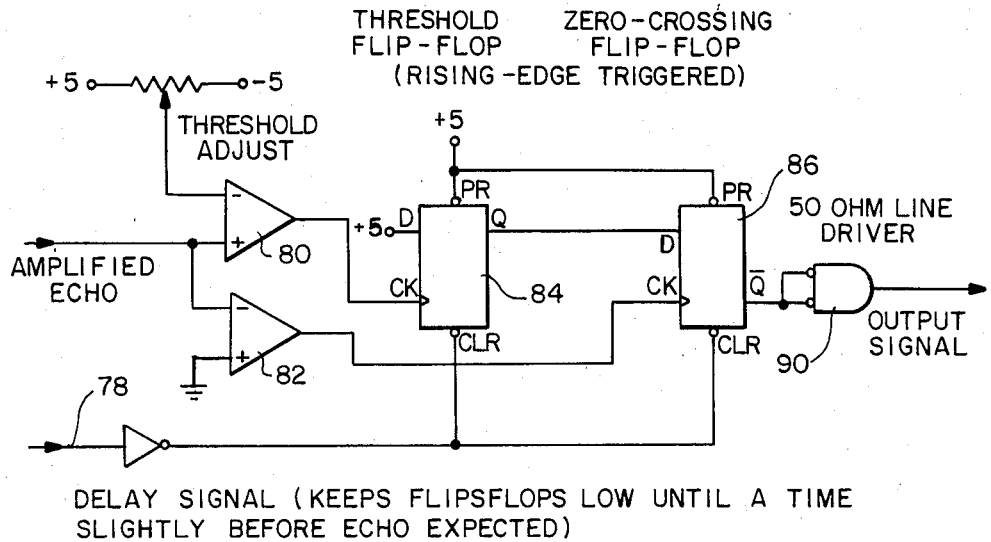
FIG.—6
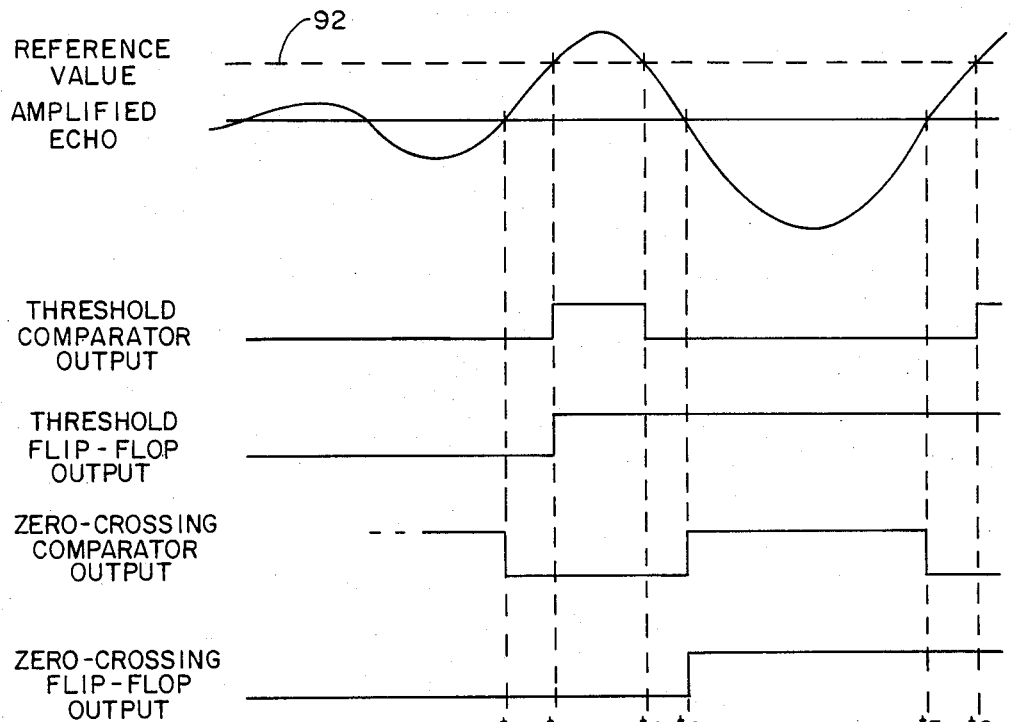
FIG.—7   DETECTION CIRCUITRY TRIGGERING PROCESS

COPPER VAPOR LASER ACOUSTIC THERMOMETRY SYSTEM

FIELD OF THE INVENTION

The United States Government has rights in this invention pursuant to Contract No. W-7405-ENG-48 between the United States Department of Energy and the University of California for operation under Lawrence Livermore National Laboratory.

BACKGROUND OF THE INVENTION

The present invention relates to a copper vapor laser (CVL) acoustic thermometry system.

Metal vapor lasers, in particular copper vapor lasers (CVL), have been shown to be powerful, efficient sources of visible laser light. In order to optimize the performance of these devices and extend their usable life-time, it is desirable to operate them within a narrow (less than 10° C.) temperature range. The plasma tube temperature of a CVL could be held at an optimal value by varying the input power based on the current temperature.

Conventional thermometry systems prove inadequate for CVL systems due to the high temperature involved (1450° C.), resolution requirements, the intense electromagnetic fields within and around the plasma tube, and several mechanical constraints. It would, therefore, be desirable to provide an acoustic thermometry system for a CVL laser which provides an accurate indication of the average temperature within the CVL laser tube.

SUMMARY OF THE INVENTION

It is an object of the present invention to provide an improved copper vapor laser (CVL) acoustic thermometry system.

It is a more particular object of the present invention to provide an improved CVL acoustic thermometry system which provides a very accurate indication of the average temperature within a CVL laser tube.

The thermometry system includes alumina rod means for axially coupling an acoustic pulse a predetermined distance from a coupling point into the interior of a metal vapor laser such that an echo pulse corresponding to the acoustic pulse is reflected from the interior of the laser to the coupling point without affecting the operation of the laser.

The system further includes means for measuring the period of time between the coupling of the acoustic pulse and the return of the echo pulse to the coupling point. The temperature at the predetermined point in the laser is proportional to the period of time indicated above, so that the system includes means for processing that measured time difference to provide a temperature indication at the predetermined interior point within the laser.

Additional objects, advantages and novel features of the present invention will be set forth in part in the description which follows and in part become apparent to those skilled in the art upon examination of the following, or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings, which are incorporated in and form a part of this specification, illustrate an embodiment of the invention and, together with the description, serve to explain the principles of the invention.

FIG. 1 depicts a block diagram of an acoustic thermometry system to control a copper vapor laser (CVL).

FIG. 2 depicts an alumina rod and transducer in conjunction with a CVL laser tube for use with the present invention.

FIGS. 5A and 5B depict schematic diagrams of the switching network, which forms a portion of FIG. 3.

FIG. 6 depicts a general logic diagram for describing the operation of the echo detection circuitry, which forms a portion of FIG. 3.

FIG. 7 depicts a timing diagram for illustrating a cycle of operation of the echo detection circuitry logic depicted in FIG. 6.

DETAILED DESCRIPTION OF THE DRAWINGS

Figure 3:
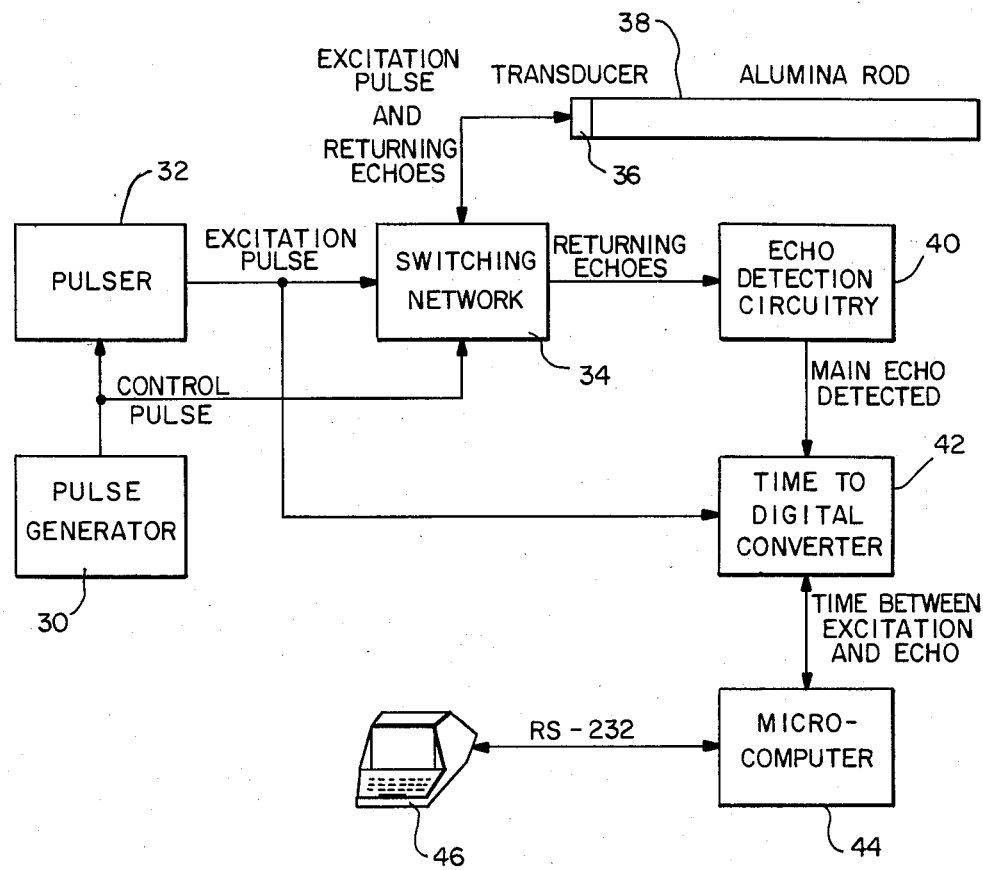
FIG. 3 depicts a block diagram of a CVL acoustic thermometry system which forms a portion of FIG. 1.

Reference will now be made in detail to the preferred embodiment of the invention, an example of which is illustrated in the accompanying drawings. While the invention will be described in conjunction with that preferred embodiment, it will be understood that it is not intended to limit the invention to that embodiment. On the contrary, it is intended to cover alternatives, modifications and equivalents as may be included within the spirit and scope of the invention as defined by the appended claims.

Referring now to FIG. 1, a control diagram employing an acoustic thermometry system to control a copper vapor laser (CVL) input power control voltage is depicted.

The CVL system 10 of FIG. 1 is associated with an acoustic thermometry system 12 which provides an accurate indication of the operating temperature of CVL system 10. In FIG. 1, the temperature information from acoustic thermometry system 12 is provided to data interpretation means 14, which generates the temperature information data to summing circuit 16 via lead 18. Summing circuit 16 also receives a setpoint signal which is related to the desired operating temperature of the CVL. The difference or error signal on lead 20 is provided to the control algorithm means 22. The data interpretation means 14 and control algorithm means are desirably software implemented but could, if desired, be hardware implemented. The loop to CVL system 10 is thus completed via control algorithm means 22 providing appropriate input power control voltage signals to CVL system 10.

This control loop is implemented by means of acoustic thermometry system 12, the details of which will now be described in more detail.

As previously described, conventional thermometry systems prove inadequate for CVL systems due to the high temperature involved (1450° C.), resolution requirements, the intense electromagnetic fields within and around the plasma tube, and several mechanical constraints. An acoustic thermometry system according to the present invention has been designed and prototyped to meet the requirements of this application. The present invention far exceeds the resolution requirements and should work well in a CVL or other metal vapor laser environment.

Referring now to FIGS. 2 and 3, the acoustic thermometry system according to the present invention operates in the following manner. In FIG. 2, a narrow electrical pulse is created and sent to a piezoelectric crystal transducer 26. The resulting acoustic energy in the form of a compressional wave is then coupled into a small diameter (0.125") rod 28, which has the majority of its length (36") within the laser tube 24. The wave then propagates down the length of rod 28. As predicted by wave theory, a nearly total reflection occurs at the end of rod 28 and the reflected wave travels back toward the transducer 26. Since both the length of rod 28 and the velocity of sound in rod 28 are temperature dependent quantities, the time difference between the excitation pulse and the returning echo is a function of temperature. This time difference is measured and the rod temperature is calculated from this data.

FIG. 3 depicts a block diagram of a CVL acoustic thermometry system according to the present invention in more detail. In FIG. 3, a pulse generator circuit 30 provides a control pulse to pulser circuit 32, which generates the excitation pulse. In turn, a switching network 34 is connected to receive the excitation pulse from pulser 32 and, in addition, the control pulse from pulse generator 30. Switching network 34 switches the excitation pulse for connection to transducer 36, which couples the excitation pulse to alumina rod 38 in the form of an acoustic sound wave. The sound wave travels along alumina rod 38 in a manner as described in conjunction with FIG. 1. The returning echo pulse along alumina rod 38 is coupled from transducer 36 to switching network 34, which in turn switches the returning echo to echo detection circuitry 40. Echo detection circuitry 40 determines when the main echo has been detected and couples this event to the time to digital converter (TDC) circuit 42.

TDC 42 also receives the excitation pulse from pulser 32 in order to determine the time difference between the excitation pulse and the returning echo.

This information is connected to microcomputer 42 which processes the information and provides to display 46 the necessary information for graphically illustrating the desired temperature information.

To exist within the environment of the CVL plasma tube with the strong electromagnetic fields and high temperatures, the probe of the acoustic thermometry system must be composed of a dielectric with a very high melting temperature. In a preferred embodiment, Alumina ($Al_2O_3$) was chosen as the rod material and lithium niobate ($LiNbO_3$) was chosen as the transducer material.

Figure 4:
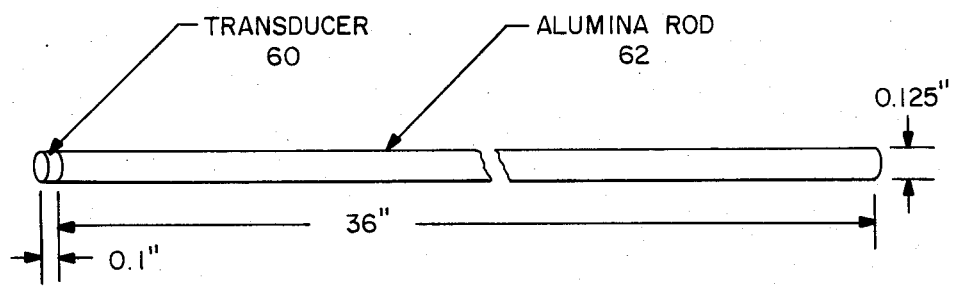
FIG. 4 depicts a CVL acoustic thermometry probe which forms a portion of the present invention.

Referring now to FIG. 4, a prototype CVL acoustic thermometry probe is illustrated wherein transducer 60 and alumina rod 62 are shown with their actual dimensions, in a preferred embodiment. Although transducer 60 is outside of the CVL tube, it will experience relatively high temperatures due to conduction through rod 62. Lithium niobate was an ideal candidate for this application due to its high Curie temperature (1150° C.). Alumina was also a desired choice due to the fact that the laser tubes themselves are composed of this material and is readily available. Very thin (<1.0 mm) sapphire fibers may offer some advantages over alumina rods.

Referring to FIG. 3, a standard laboratory pulser 32 can be used as the source of the excitation pulse. A solid state switching network 34 routes the excitation pulse and the returning echoes into the appropriate subsystems. The echoes are fed into a threshold based detection circuit 40. Its output and the excitation pulse are then fed into a commercially available Time-to-Digital-Converter (TDC) 42. The accuracy and resolution of this thermometry system are dependent on the resolution of TDC 42. In the prototype, a one nanosecond TDC was employed which, in theory, should yield a temperature resolution of less than 0.5° C. Upon investigation, however, a resolution of approximately 1.0° C. was seen. This far exceeds the requirements of the desired application.

In the system of FIG. 3, the output of TDC 42, the time difference between the excitation pulse and first echo, is fed into a microcomputer 44. The computer then takes this time value and converts it into a temperature through the use of a polynomial evaluation. The polynomial can be generated by a curve fitting program using several previously determined data points. Lookup-tables could also be employed to perform this conversion. A digital filtering algorithm is then employed to smooth the resulting temperature data. The filtered data is then displayed on a standard video terminal 46. The temperature data can be sent to the control algorithm 22 to control the input power of the CVL.

Referring now to FIGS. 5A and 5B, schematic diagrams of a suitable switching network 34 are depicted. In one embodiment, a typical switching network could be Analog Devices Model No. AD759001, which is a well known analog switch. In FIG. 5A, the excitation pulse of FIG. 3 is input to switches 70 which, with appropriate control pulses from the Pulse Generator 30 of FIG. 3, operate to close switches 70 for switching the excitation pulse to the transducer 36 of FIG. 3.

Similarly, the echo pulse from transducer 36 of FIG. 3 is switched via the analog switch of FIG. 5B for input to the echo detection circuitry 40 of FIG. 3. The return acoustic pulse from the transducer 36 is switched via a suitable control pulse from Pulse Generator 30 of FIG. 3 for switching to the echo detection circuitry 40 of FIG. 3.

Referring now to FIGS. 6 and 7, the operation of the echo detection circuitry 40 of FIG. 3 is described in more detail.

FIG. 7 depicts a timing diagram illustrating the amplified echo signal from switching network 34. In a preferred embodiment, the present invention detects the first zero crossing of the amplified echo signal after the amplified echo signal reaches the predetermined value in terms of amplitude. This point (the first zero crossing after the amplified echo reaches the predetermined value) is indicated at $t_4$ of FIG. 7. In FIG. 6, the amplified echo signal is input to a threshold comparator 80, the output of which is input as a clock to a threshold flipflop 84, which in turn is connected as a "D" input to a zero crossing flipflop 86. Both flipflops 84, 86 are cleared by a delay signal 78, which keeps the flipflops 84, 86 in a low state until a time slightly before the echo signal is expected. The echo signal in FIG. 6 is also input to a zero crossing comparator 82, the output of which is input as a clock to zero crossing flipflop 86.

At time $t_1$, the output of zero crossing comparator 82 changes state, as the amplified echo signal is passing a zero crossing point. At time $t_2$, the outputs of threshold comparator 80 and threshold flipflop 84 change states, and at time $t_3$, the output of threshold comparator 80 changes its state back to its original condition, which indicates that the amplified echo signal is passing through the predetermined reference value 92 toward the zero crossing point, as indicated in FIG. 7.

As indicated above, at time $t_4$, the amplified echo signal passes through the zero crossing, which is indicated by the output of zero crossing comparator 82 changing state together with the output of zero crossing flipflop 86 also changing state. In FIG. 7, the output signal from gate 90 is then input to the time to digital converter 42 of FIG. 3. The processing of the output signal from gate 90 can then proceed, as described previously.

The amplified echo signal continues to oscillate, as indicated in FIG. 7, so that the output of zero crossing comparator 82 changes state at time $t_5$ and the output of threshold comparator 80 changes state at time $t_6$. However, it is at time $t_4$ that the logic of FIG. 6 provides an output signal which enables the present invention to determine the temperature within the laser by suitable processing, as described previously.

Although the device is a very useful tool as it stands, many future extensions are possible for this technology. Improvements that would increase system resolution, accuracy, cost effectiveness, and reliability are straightforward and hold a great deal of promise. The application can also be expanded upon in order to get a temperature profile of the laser rather than an average temperature. It is also possible to envision other applications of this thermometry system to gas discharge lasers or other types of lasers.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are best suited to the particular use contemplated. It is intended that the scope of the invention be defined by the claims appended hereto.

What is claimed is:

1. A thermometry system for a laser comprising:
   alumina rod means for axially coupling an acoustic pulse a predetermined distance from a coupling point into the interior of said laser such that an echo pulse corresponding to said acoustic pulse is reflected from the interior of said laser to said coupling point without affecting operation of said laser,
   means for measuring a period of time between the coupling of said acoustic pulse and the return of said echo pulse to said coupling point, and
   means for processing the measured time difference to provide a temperature indication at the predetermined interior point within said laser.

2. A system as in claim 1 wherein said laser is a metal vapor laser.

3. A system as in claim 2 wherein said laser is a copper vapor laser.

4. A system as in claim 1 wherein said laser is a gas discharge laser.

5. A system as in claim 1 wherein said means for measuring include logic means for determining occurrence of a zero crossing point of said echo pulse after said echo pulse has oscillated through a first predetermined reference value.

6. A system as in claim 5 wherein the occurrence of said zero crossing point after a oscillation is the first zero crossing point.

7. A thermometry system for a metal vapor laser comprising:
   transducer means for generating an acoustic pulse and for axially coupling said acoustic pulse a predetermined distance from a coupling point into the interior of said metal vapor laser such that an echo pulse corresponding to said acoustic pulse is reflected from the interior of said laser to said coupling point without affecting operation of said laser,
   means for measuring a period of time between the coupling of said acoustic pulse and the return of said echo pulse to said coupling point, and
   means for processing the measured time difference to provide a temperature indication at the predetermined interior point within said laser.

8. A system as in claim 7 wherein said transducer means includes an alumina rod.

9. A system as in claim 8 wherein said transducer means is lithium niobate.

10. A thermometry system for a metal vapor laser comprising:
    alumina rod means for axially coupling an acoustic pulse a predetermined distance from a coupling point into the interior of said laser such that an echo pulse corresponding to said acoustic pulse is reflected from the interior of said laser to said coupling point without affecting operation of said laser,
    means for measuring a period of time between the coupling of said acoustic pulse and the return of said echo pulse to said coupling point, and
    means for processing the measured time difference to provide a temperature profile within said laser.

11. In a thermometry system for determining an indication of temperature within a laser at a predetermined point, the method comprising the steps of
    axially coupling an acoustic pulse a predetermined distance from a coupling point into the interior of said laser such that an echo pulse corresponding to said acoustic pulse is reflected from the interior of said laser to said coupling point without affecting operation of said laser,
    measuring a period of time between the coupling of said acoustic pulse and the return of said echo pulse to said coupling point, and
    processing the measured time difference to provide an indication of a temperature at the predetermined interior point within said laser.

12. The method as in claim 11 including the step of determining an occurrence of a first zero crossing point of said echo pulse after said echo pulse has oscillated through a first predetermined reference value.

* * * * *